United States Patent [19]
Heldreth

[11] 3,949,578
[45] Apr. 13, 1976

[54] PUMP WITH SELF-CLEANING LINT FILTER

[75] Inventor: Robert L. Heldreth, Mansfield, Ohio

[73] Assignee: White-Westinghouse Corporation, Cleveland, Ohio

[22] Filed: May 16, 1974

[21] Appl. No.: 470,497

Related U.S. Application Data

[62] Division of Ser. No. 273,257, July 19, 1972, Pat. No. 3,836,001.

[52] U.S. Cl. .................................. 68/18 F; 210/167
[51] Int. Cl.² .......................................... B01D 35/22
[58] Field of Search ............ 210/167, 416; 68/18 F

[56] References Cited
UNITED STATES PATENTS

| | | | |
|---|---|---|---|
| 1,675,200 | 6/1928 | Smith | 210/416 |
| 3,344,623 | 10/1967 | Famah et al. | 210/167 X |
| 3,455,456 | 7/1969 | Wolters | 210/167 X |

*Primary Examiner*—Frank A. Spear, Jr.
*Attorney, Agent, or Firm*—McNenny, Farrington, Pearne & Gordon

[57] ABSTRACT

The invention provides a bi-directional single-impeller centrifugal pump having a filter screen enclosed within the pump housing and interposed, in the pump chamber, between the single pump inlet and one of two outlets defined in the housing for filtering the fluid pumped through the one outlet in response to the impeller rotating in one direction. When the impeller is reversed to pump the fluid through the other outlet, the particles of lint etc., retained within the pump chamber by the filter screen are then free to exit the pump as flushed therefrom by the fluid being pumped through the other outlet.

2 Claims, 3 Drawing Figures

PUMP WITH SELF-CLEANING LINT FILTER

This is a division of application Ser. No. 273,257, filed July 19, 1972, now U.S. Pat. No. 3,836,001.

RELATED APPLICATION

The pump of the present invention is related to the pump disclosed in the copending application, Ser. No. 166,096, now U.S. Pat. No. 3,751,179, of W. A. Wasemann having a common assignee.

BACKGROUND OF THE INVENTION

1. Field of the Invention:

This invention relates to a centrifugal pump having a pumping chamber defined by a casing providing one inlet and two outlets with the pumped fluid being directed through either one or the other of the outlets depending upon the direction of rotation of the pump impeller. More particularly, the present invention is directed to a pump of the above nature including a filter interposed within the pumping chamber between the inlet and one of the outlets for filtering water discharged through that one outlet, with the filter being cleaned by a flushing action when the impeller is reversed to pump the water through the other outlet.

2. Description of the Prior Art:

In that the pump of the present invention is primarily utilized in the environment of laundry apparatus, such as an automatic washing machine, the prior art associated with this environment will be discussed.

It is well known to continuously circulate the wash water during the agitation or wash portion of the timed cycle of an automatic washing machine to provide an opportunity to pass the wash fluid through a filtering mechanism to trap the suspended lint particles and the like which, if not filtered, tend to be caught in the clothes being laundered as the wash water flows through them. One such apparatus for filtering the circulating water is shown in U.S. Pat. No. 2,555,725 which shows a pump attached to the water-containing tub of the washing machine. The pump includes two outlets with valve means and associated valve control means to determine the flow path the pumped fluid has between a recirculating line (the line through which the water is continuously circulated) or a drain line. Interposed between the pump and the valve in the circulating line is a self-cleaning filtering mechanism which is placed in a filtering position in this line by automatic control means. Through the use of this pump and associated filter structure, as the wash fluid is being pumped through the recirculating line, the control means maintains the filter in the path of the fluid; however, when the timer control has advanced through the wash portion of the cycle to a drain and pump-out portion, the filtering means will automatically move to another position whereupon it is subjected to a flushing action by the draining fluid and thereby cleaned.

As the laundry appliance field is highly competitive the above-described pump and filtering mechanism requiring valves and automatic actuating mechanisms including solenoids, was prohibitively expensive and therefore the most prevalent type of pumping and filtering means comprises a reversible centrifugal pump which pumps to either a recirculating line or a drain line depending upon the direction of rotation of the impeller, with the recirculating line discharging above the normal water level in the clothes containing tub so that a manually accessible filter could be interposed between the recirculating line and the water. This structure eliminated the expensive valve and valve control means and also permitted the structure defining the filtering mechanism to serve as a receptacle for washing additives which were then added to the wash water by the action of the recirculating water as it passed through the filtering structure.

The above arrangement was generally accepted even though it had obvious shortcomings, not the least of which was that the water falling from the recirculating discharge tended to splash on the filtering pan and carry with it lint particles previously trapped by the filter. Further, the filter required attention in that it had to be regularly manually cleaned. And, lastly, the impact of the recirculating fluid on the filtering pan tended to aerate the water often causing an oversudsing problem.

SUMMARY OF THE INVENTION

The invention discloses a bi-directional single impeller centrifugal pump having a filter screen permanently disposed within the pump housing in position to filter the water flowing through the outlet connected with the recirculation line and flushed by the water flowing to the outlet associated with the drain line so that the lint particles trapped by the filter within the pump housing are subsequently carried to drain whenever the pump is placed in that mode of operation. Such pump and filter mechanism, in addition to providing a self-cleaning filter, eliminates the necessity for valves and valve control mechanisms to determine the direction of the pumped fluid and further permits the option of directing the recirculating line to discharge into a washing machine below the normal water level within the machine thereby eliminating splashing and sudsing.

DRAWING DESCRIPTION

DESCRIPTION OF THE PREFERRED EMBODIMENT

Figure 1:
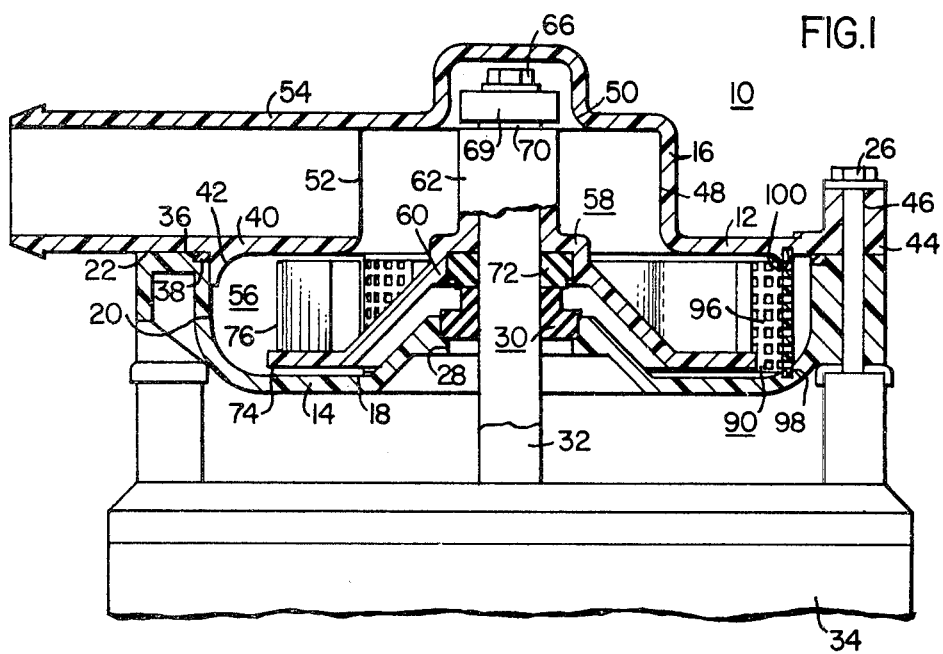
FIG. 1 is a cross-sectional elevation view of the pump of the present invention.

The preferred structure of the centrifugal pump of the present invention will be described with reference to both FIGS. 1 and 2. As therein shown, the pump 10 has a housing 12 generally formed by fastening together two separate components, namely a bottom member 14 and a top member 16. Each member is preferably molded from a plastic such as polypropylene.

The bottom member 14 includes a generally planar bottom wall 18 and an upstanding peripheral side wall 20 with the juncture between the side wall and the bottom wall radiused so as to provide a generally smooth contour. The side wall 20 terminates in a radially outwardly projecting flange 22 having apertures 24 therein through which connecting bolts 26 are received. The bottom wall 18 also centrally defines an aperture 28 having a stepped wall configuration so as to properly receive a seal 30 through which the rotating shaft 32 of a reversible motor 34 projects into the pump housing 12. Similarly, flange 22 has a stepped configuration such as at 36 for receiving an annular O-ring 38 generally around the inner periphery of flange 22.

The top member 16 includes a generally planar top wall 40 in opposed facing relation with bottom wall 18, with the outermost periphery of top wall 40 radiused as at 42 to provide a generally smooth contoured transition between the horizontal top wall and the vertical side wall 20 of the bottom member 14. The radially outermost portion of the top member 16 defines a flange 44 in opposed facing relation to flange 22 of the bottom member and has apertures 46 for alignment with apertures 28 of the bottom member through which the mounting bolts 26 are received. It is seen that in the assembled position shown in FIG. 1, the face-to-face engagement of the cooperating flange members compresses the O-ring 38 to provide a generally water-tight seal around the periphery of housing 12.

The central portion of top wall 40 defines a generally cylindrical chamber defined by an upstanding generally vertical wall 48 covered by a contoured dome member 50 and provides a configuration for the housing to internally accommodate structure attaching the impeller to the drive shaft 32 of the motor 34 as will be subsequently described.

The vertical wall 48 defines an opening 52 therein which is bounded by an outwardly projecting nipple member 54 providing an inlet to the pumping chamber 56 which can generally be defined as the internal space formed by the opposing top wall 14 and bottom wall 18 and peripheral side wall 20.

An impeller 58 is disposed within the housing 12 in driving engagement with shaft 32 of a reversible motor 34. The impeller 58 includes a central hub portion 60 having a sleeve member 62 which telescopically receives the shaft 32 therein. The upper end of the sleeve contains an aperture in alignment with a threaded aperture in the shaft for receiving a bolt member 66. Sealing means such as a top disk 69 and an O-ring 70 are interposed between the headed bolt 66 and the sleeve to provide a sealing engagement when the bolt is tightened to secure the impeller on shaft 32. The lower portion of the hub 60 has a generally truncated conical form to conform to the contour of the lower bottom wall 18 and seal 30 and itself encloses a mating sealing means 72 in facing engagement with the seal 30 of the bottom member 14.

The impeller 58 extends radially outwardly from the hub member forming a generally planar bottom wall 74, the bottom face of which is in close facing relationship with the bottom wall 18 of the bottom member 14. The upper face of the impeller's bottom wall 74 supports a plurality of impeller blades 76 which have an arcuate configuration (see FIG. 2) to provide a pumping capability in either direction of rotation of the impeller; however, with the pumping capacity of the blade in one direction being substantially more efficient than the pumping capacity of the impeller blade in the opposite direction.

Figure 2:
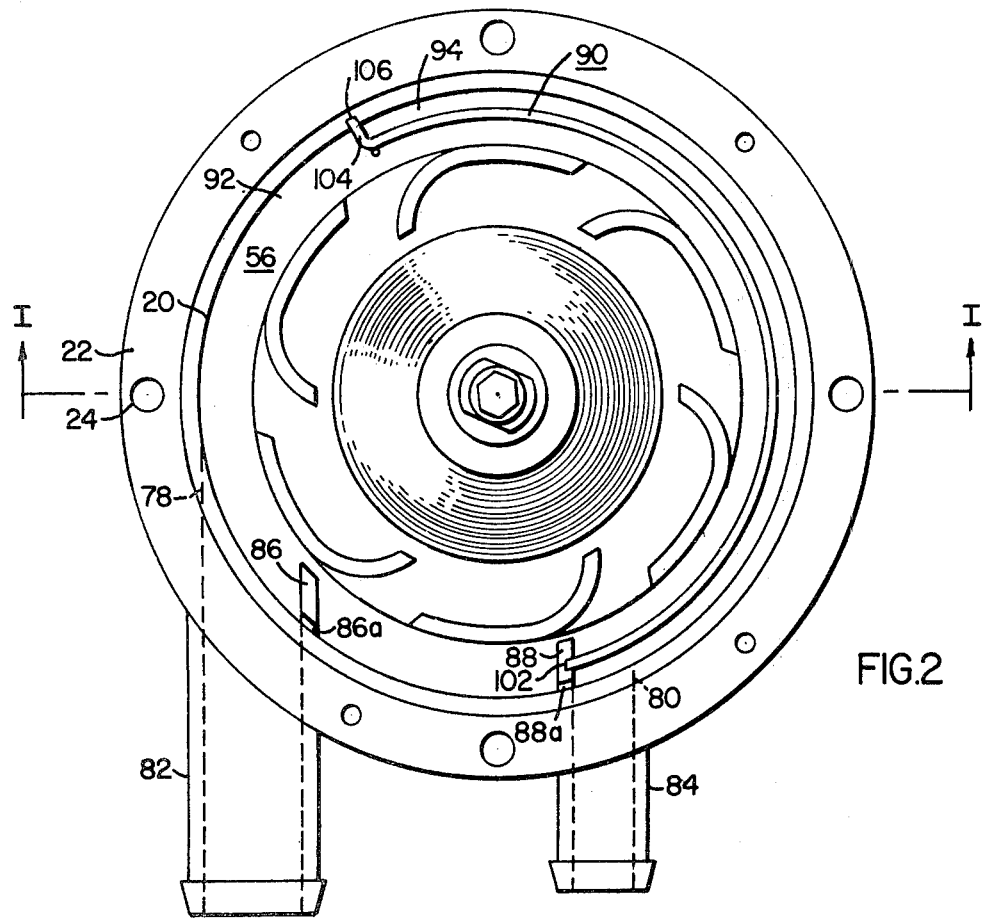
FIG. 2 is a plan view of the lower housing member including the impeller and filtering screen; and, FIG. 3 is an elevation view of the pump in a washing machine.

Referring now to FIG. 2, it is seen that the side wall 20 of the bottom member 14 defines outlet apertures 78 and 80 which are bounded by integrally molded outwardly extending nipple portions 82 and 84 respectively. Aperture 78 is generally the larger of the two outlets and its associated nipple portion 82 extends generally tangentially from the side wall 20. Additionally, a short projection or dam means 86 extend inwardly from the side wall 20 generally adjacent the aperture 78 on the side opposite the tangential wall of the nipple portion 82 and in parallel facing relation thereto.

Outlet aperture 80 and its associated nipple portion 84 extend generally parallel to outlet aperture 78 and nipple 82 however in a non-tangential position with respect to the side wall 20. Aperture 80 is also associated with a dam member 88 extending inwardly from the side wall 20 on the side of the aperture closest to the dam 86 associated with outlet aperture 78 so that the two described dam members are interposed within the pumping chamber between the two outlets 78 and 80. It is to be noted that the dam members extend from the bottom wall upwardly to a height so as to abut the top wall 40, and thus are notched as at 86a and 88a so as to permit them to receive the top wall radius 42.

The pump as described up to this point is generally the same as the pump in the previously identified copending related application; however, the pump 10 of the present invention further includes filter means 90 disposed within the pump chamber 56 to generally partition the pump chamber into two annular chambers 92 and 94 as separated by the filter means 90.

Referring to FIG. 1, the filter means 90 comprises a generally fine mesh screen member 96, preferably molded of plastic, having the general configuration of an arcuate strip of constant height sufficient to extend from the bottom wall 18 to the top wall 40 and properly positioned within the pumping chamber by being received within an arcuate notch 98 formed in the bottom wall and a similar opposing arcuate notch 100 formed in the top wall. Further, the screen is positioned immediately in front of outlet aperture 80 with one end abutting dam member 88 which contains a notch 102 for properly seating the filter in this position. The opposite end of the screen member is outwardly formed as at 104 so as to extend toward the side wall 20 and it likewise is properly seated in position by being received within a notch 106 formed therein.

It is thus seen that with the top member 16 and bottom member 14 secured together the fluid, entering the inlet 52, must first pass through some portion of the filter 90 before it can be discharged through outlet aperture 80 and nipple 84, whereas, the fluid is free to exit through the other outlet 78 without passing through the filter 90.

Figure 3:
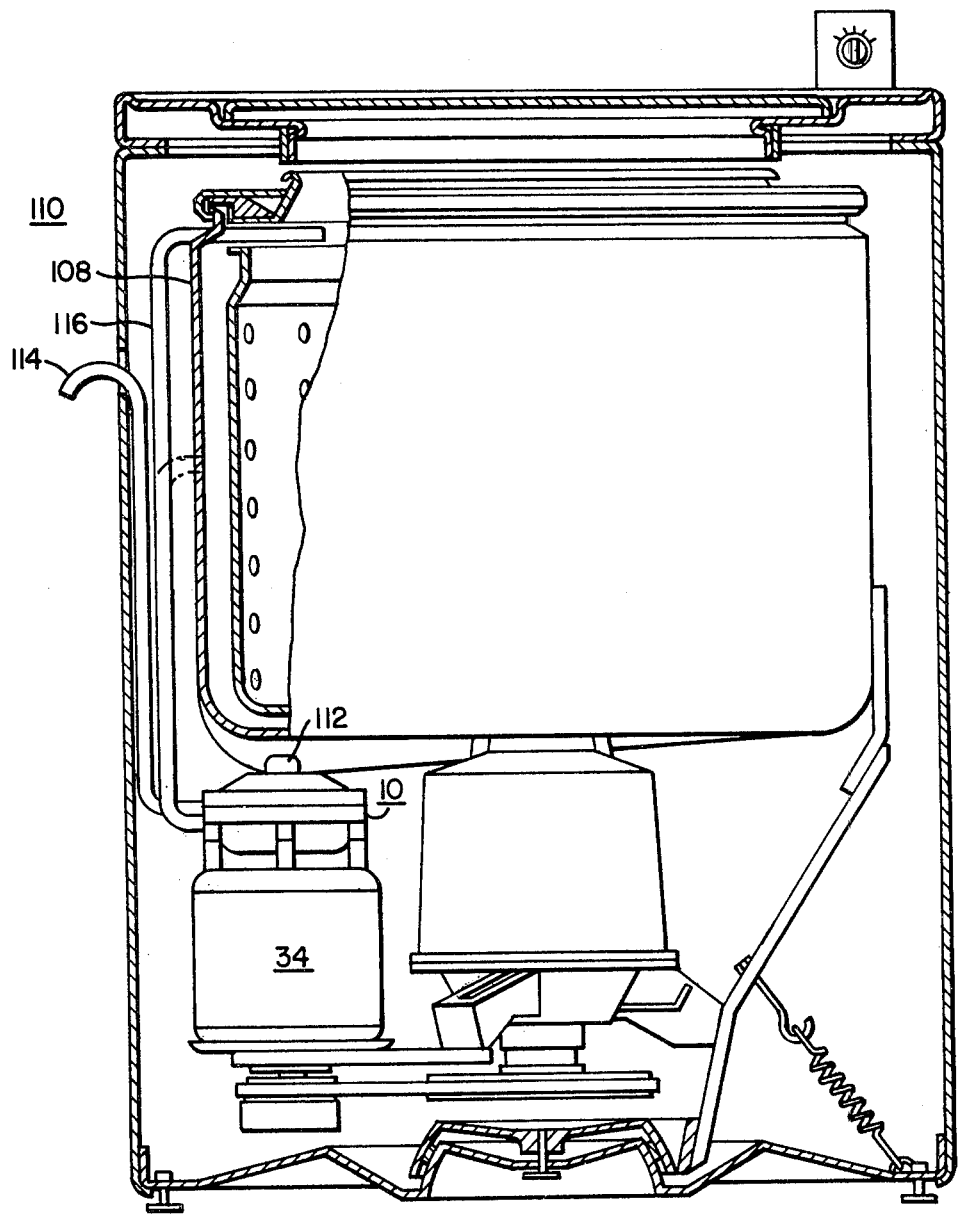

In the pump 10, as described, when the impeller is rotated by the motor in a counterclockwise direction, as viewed in FIG. 2, fluid entering the inlet 52 is discharged through outlet aperture 78 at a relatively large volume whereas, when the impeller is reversed so as to be rotated in the clockwise direction the pumped fluid is discharged from the pumping chamber 56 through outlet aperture 80 at a substantially reduced volume. Thus, as shown in FIG. 3, in the normal application, the inlet opening is connected to the outer tub 108 of an automatic washing machine 110 through an appropriate hose 112 with the outlet aperture 78 and nipple 82 connected to a drain hose 114 and outlet aperture 80 and nipple 84 connected to a recirculating line 116. Therefore, with the washing machine performing a washing or agitating function, the impeller 58 is rotated in a clockwise direction so as to continuously recirculate the water. In this mode of operation the lint containing wash water enters the pumping chamber through the inlet opening 52 and in flowing through the filter 90 so as to be discharged through the recirculating aperture 80 the lint is retained on the screen member 96 or in the chamber 92 formed between the impeller and the screen member 96. When the impeller is reversed at the end of the agitation cycle to pump the wash water to drain, the lint collected within chamber 92 is flushed by the incoming water so as to exit chamber 92 through the drain outlet aperture 78 thereby cleaning all the collected lint from the screen 96 and the chamber 92.

It is noted in FIG. 2 that the screen member 96 extends annularly approximately two-thirds of the way around the pump chamber, thereby providing more than sufficient cross-sectional area to accommodate the relatively low volumetric flow rate discharging from the recirculating outlet 80 without causing any substantial velocity gradient across the filtering member that might accompany a filtering area of reduced size. As a matter of fact, in a transparent working model of the above-described pump, it was noted that the lint collected in chamber 92 did not exhibit any definite tendency to plaster itself against the screen 96 and in fact the lint particles remained in a generally suspended fluidized condition being continuously stirred by the turbulence of the fluid in the chamber 92 such that when the impeller was reversed to pump to drain, the lint collected in chamber 92 was immediately flushed through the drain outlet clearing the pumping chamber for subsequent operation. However, it has been found that a filter screen of a cross-sectional area only equal to the cross-sectional area of the recirculating outlet under the same circumstances became immediately clogged with lint and prevented the flow through the recirculating outlet. As the amount of lint developed under actual washing conditions depends upon the type of fabrics being laundered and, as an oversized screen or filtering member such as disclosed does not effect the pumping characteristics of this pump, it is better to provide a large filtering area, such as one having the length described so that even when exposed to extreme lint producing washing conditions it will permit flow. The choice of an oversized screen area is not meant to imply that a filter of lesser area will not operate satisfactorily under most conditions; however, for the purpose of the present pump, in that the filter is generally inaccessible once the pump has been mounted on the machine, it was felt safer to oversize than undersize the area of the filter.

Referring again to FIG. 3, it is seen that a pump of the above construction having a filter within the body of the pump permits the option of directing the recirculating filtered water to re-enter the tub either above the water level to be used to flush wash additives from a dispenser as is presently well known in the art or below the water level (shown in phantom) to eliminate the aeration of the water and its attendant sudsing.

What is claimed is:

1. In an automatic washing machine having an outer generally stationary water containing tub; a rotatable foraminous clothes tub; reversible drive means for selectively driving said machine through various modes of operation including a washing mode and a spin dry mode of operation; and, a reversible centrifugal pump, said pump including a housing providing a pump chamber bounded by the internal wall structure of said housing and including a rotatable impeller enclosed within said chamber, said pump having an inlet port connected to said water containing tub and first and second outlet ports respectively connected to a drain hose and a recirculate hose, said pump operatively connected to said reversible drive means in a manner that drives said pump to discharge through said second outlet port during said washing mode and through said first outlet port during said spin dry mode of operation; wherein the improvement comprises:

a stationarily mounted screen filter disposed within said pump chamber spaced between said impeller and said internal wall structure, said filter positioned between said inlet port and said second outlet port and between said second outlet port and said first outlet port; whereby, operation of said drive means to impart said washing mode also drives said pump in a recirculate mode wherein said impeller rotates in one direction causing water to flow from said pump inlet, through said filter and out said second outlet port such that filter removed particles are retained within the pump chamber, reversal of said drive means to impart said spin dry mode also drives the pump in a drain mode wherein said impeller rotates in the other direction causing water to flow from said inlet port to said first outlet port, such that a turbulent flow path is developed between said inlet port and said first outlet port, said flow path flushing any filter removed particles retained in the pump chamber out of said first outlet port.

2. An automatic washing machine according to claim 1 wherein said recirculate hose leads from said second outlet port of said pump to said water containing tub to discharge water at a point below the normal water level of said tub during said washing mode.

* * * * *